US009866405B2

(12) United States Patent
Vinod et al.

(10) Patent No.: US 9,866,405 B2
(45) Date of Patent: Jan. 9, 2018

(54) METHOD AND SYSTEM FOR PREVENTING MAC ADDRESSES LEARNING IN A PROVIDER BACKBONE NETWORK (PBBN)

(75) Inventors: Kumar Madaiah Vinod, Karnataka (IN); Ojha Somnath, Karnataka (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 552 days.

(21) Appl. No.: 13/315,440

(22) Filed: Dec. 9, 2011

(65) Prior Publication Data

US 2012/0314708 A1 Dec. 13, 2012

Related U.S. Application Data

(63) Continuation of application No. PCT/IN2010/000393, filed on Jun. 10, 2010.

(30) Foreign Application Priority Data

Jun. 10, 2009 (IN) ........................... 1365/CHE/2009

(51) Int. Cl.
*H04L 12/28* (2006.01)
*H04L 12/56* (2006.01)
*H04L 12/46* (2006.01)
*H04L 12/715* (2013.01)
*H04L 12/751* (2013.01)

(52) U.S. Cl.
CPC ...... *H04L 12/4625* (2013.01); *H04L 12/4658* (2013.01); *H04L 12/4662* (2013.01); *H04L 45/02* (2013.01); *H04L 45/04* (2013.01)

(58) Field of Classification Search
CPC ......... H04L 45/02; H04L 45/04; H04L 45/10; H04L 12/66; H04L 2012/46; H04L 2012/5618; H04L 12/46; H04L 12/56; H04L 2012/56; H04L 29/0653; H04L 29/06095; H04L 49/3009; H04L 49/309; H04L 49/1507
See application file for complete search history.

(56) References Cited

U.S. PATENT DOCUMENTS 7,697,534 B1 * 4/2010 Narayanan et al. .......... 370/392
2008/0212595 A1 * 9/2008 Figueira ................ H04L 12/462 370/401
2009/0141730 A1 * 6/2009 Long ............................ 370/411

* cited by examiner

*Primary Examiner* — Lonnie Sweet
(74) *Attorney, Agent, or Firm* — Oliff PLC

(57) ABSTRACT

The present invention provides a method and system for preventing MAC address learning in Provider Backbone Bridge Network (PBBN). In one embodiment, this is accomplished by receiving data frames from at least one operator/client at the first PBB network which has to be communicating to the second PBB network, adding forward path learning information from the received data frames in the first PBB network and translating backbone MAC source address of the received data frame at the first PBB network by replacing the backbone MAC source address with a BEB backbone MAC address, thereby preventing of backbone MAC address learning of the first PBB network in the second PBB network.

13 Claims, 5 Drawing Sheets

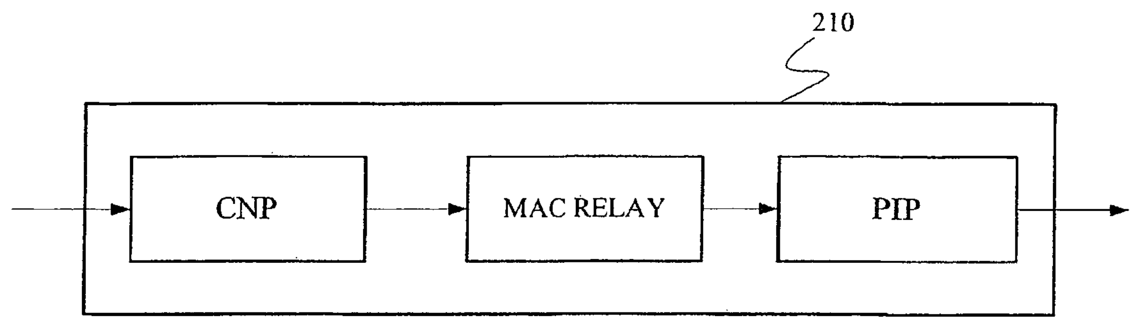
FIG 2 (a)
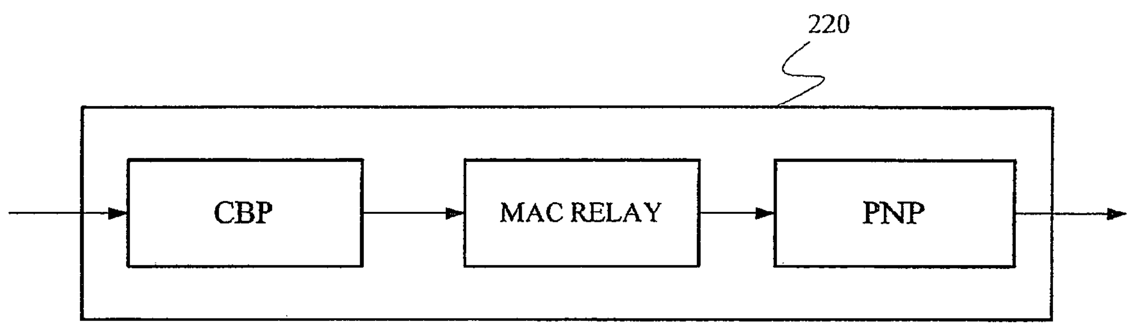
FIG 2 (b)
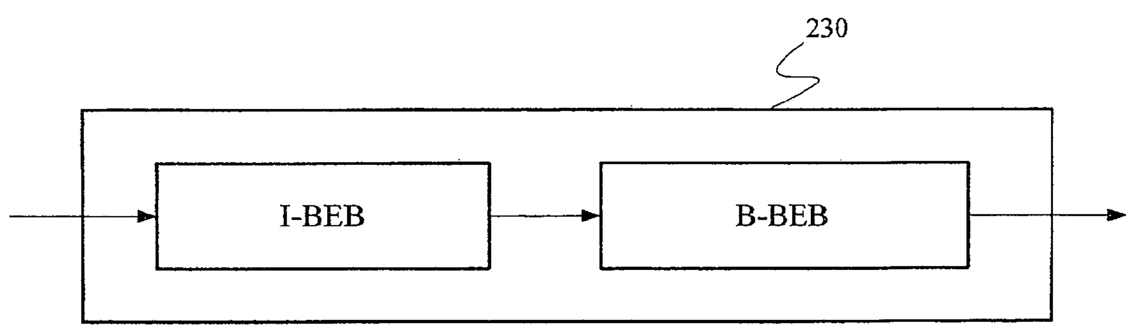
FIG 2 (c)
FIG 2

METHOD AND SYSTEM FOR PREVENTING MAC ADDRESSES LEARNING IN A PROVIDER BACKBONE NETWORK (PBBN)

REFERENCE TO RELATED APPLICATIONS

This application is a continuation of PCT/IN2010/000393, filed 10 Jun. 2010, which is hereby incorporated by reference. This application claims priority from Patent Application No. IN 1365/CHE/2009, filed 10 Jun. 2009, which is hereby incorporated by reference.

FIELD OF THE INVENTION

The present invention relates in general, to a data communication network, and in particular, to a method and system for preventing MAC addresses learning in a Provider Backbone Bridge Network (PBBN).

BACKGROUND OF THE INVENTION

Provider backbone bridging or provider backbone bridges (PBB) is an Ethernet-based technology that enables the layering of a network into customer and provider domains with complete isolation between customer and provider Media Access Control (MAC) addresses. This technology is currently being formalized as an IEEE standard identified as IEEE 802.1ah. Provider backbone bridging is implemented by adding a provider backbone header that includes a backbone source address (B-SA), a backbone destination address (B-DA), a backbone VLAN ID (B-VID), and a service instance ID (I-SID). Within a provider backbone bridging domain, packets are forwarded based on backbone media access control (MAC) addresses, loop avoidance is accomplished through Spanning Tree Protocol (STP), and B-VIDs are used for broadcast containment.

When two of Provider Backbone Bridge Networks (PBBN) is connected, they are said to be peer of each other and hence they are peering PBBN networks. This is very common when two different operators interact and customer from one PBBN operator's network wants to communicate with customer of another PBBN operator's network. While communicating, the customer frames are routed as per IEEE standards 802.1Q, 802.1D, 802.1ad, 802.1ah and 802.1Qay. The Ethernet frame header includes a destination address (DA) field, a source address (SA) field, and a VLAN identification (VID) field. When a frame is received by a bridge in first PBBN network, it executes MAC learning by binding the incoming port to the SA of the received frame and storing this information in a filtering database that maintains Forwarding Information (FI). Then the bridge determines whether it has an FI entry associated with the DA of the received frame. If yes, the bridge forwards the frame to a second PBBN network over the specified port only. If there is no associated entry yet, the bridge broadcasts the frame over all of its enabled ports except the incoming port where the frame was received.

In a pure carrier grade network, provisioning in one network should be independent of the values of MAC addresses, I-tag and B-tag values of the peering carrier or service provider network. The carrier or service provider prefers to translate the incoming values or identifiers to his own provisioned values when peering with another service provider. The problem arrives in a data path from one PBBN network to the other because of lacking in the ability to translate the incoming frame at the second PBBN network with their provisioned values. Secondly, MAC address table size of the network is increased on every data path from one node to the other and from one network to the other network.

For the reasons stated above, which will become apparent to those skilled in the art upon reading and understanding the present specification, there is a need in the art for a method and system for preventing MAC learning while peering Provider Backbone Bridge Network (PBBN).

SUMMARY OF THE INVENTION

According to one aspect of the invention there is provided a method of preventing MAC address learning in a data path from a first PBB network to a second PBB network, said path passing through plurality of intermediate bridge node in the PBB network having a plurality of input/output ports for data communication, the method including receiving data frames from at least one operator/client of the first PBB network which has to be communicated to at least one operator/client of the second PBB network, adding forward path information to the received data frames in the first PBB network, and translating backbone MAC source address of the received data frame at the first PBB network by replacing the backbone MAC source address with a BEB (Backbone Edge Bridge) backbone MAC address, thereby preventing learning of backbone MAC address of the first PBB network in the second PBB network.

In another aspect, the invention includes a system for preventing MAC address learning in a data path from a first PBB network to a second PBB network, the path passing through plurality of intermediate bridge node in the PBB network having a plurality of input/output ports for data communication, the system includes a means for receiving data frames from at least one operator/client of the first PBB network which has to be communicated to at least one operator/client of the second PBB network, a means for adding forward path information to the received data frames in the first PBB network, and a means for translating backbone source MAC address of the received data frame at the first PBB network by replacing the backbone source MAC address with a B-BEB backbone MAC address, thereby preventing of backbone MAC address learning of the first PBB network in the second PBB network.

Additional advantages and features of the present invention will be more apparent from the detailed description and accompanying drawings, which illustrate preferred embodiments of the invention.

BRIEF DESCRIPTION OF THE DRAWINGS

FIG. 2 is a functional block diagram of an I-BEB (I-Backbone Edge Bridge), B-BEB (B-Backbone Edge Bridge) and IB-BEB according to the present invention.

DETAILED DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in demonstrative embodiments," "in some embodiment," "in other embodiments," or similar language throughout this specification do not necessarily all refer to the same group of embodiments and the described features, structures, or characteristics may be combined in any suitable manner in one or more embodiments.

Figure 1:
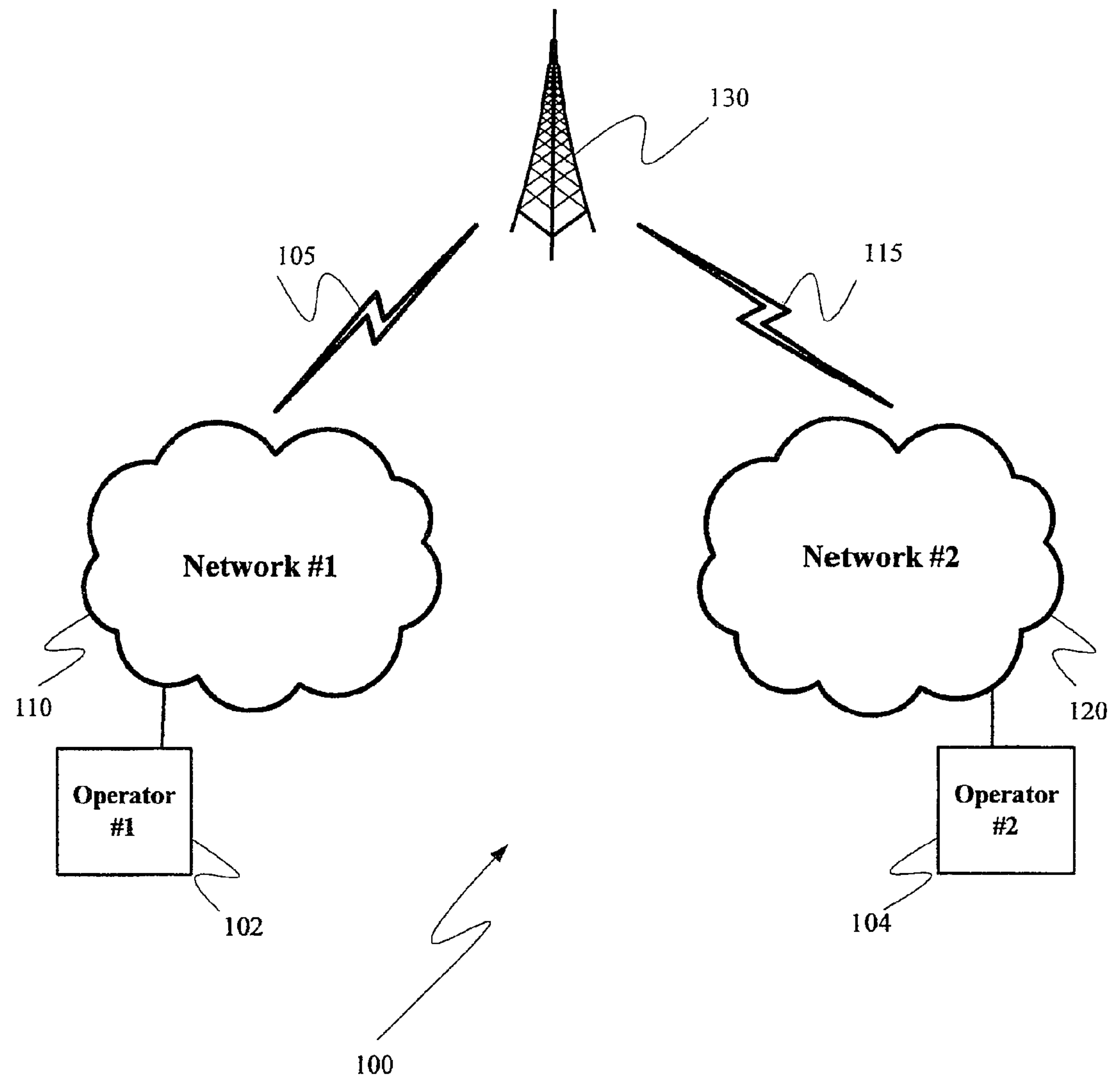
FIG. 1 is a schematic diagram illustrating a-typical data communication system.

Referring now to FIG. 1, there is illustrated a typical communication system in which the principles of this invention may be incorporated. Accordingly, the communication system 100 includes a first and a second network 110 and 120, a first and second operator 102 and 104, a first and second wireless link 105 and 115 and an antenna 130. Preferably, the communication system 100 is compatible with presently known third generation (3G) wireless systems and corresponding standards. Alternatively, the communication system 100 may also be compatible with future high-speed wireless systems and corresponding standards (e.g., fixed or mobile).

According to various aspects, the first operator 102, and/or the second operator 104 may comprise a wireless communication device. For example, the first and/or second operator may be or may include, for example, a mobile phone, a cellular phone, a handheld device, a computing device, a computer, a mobile computer, a portable computer, a laptop computer, a notebook computer, a tablet computer, a network of multiple inter-connected devices, a handheld computer, a handheld device, a PDA device, a handheld PDA device, a vehicular device, a non-vehicular device, a mobile or portable device, or the like. According to some aspects, the first operator 102, and/or the second operator 104, may comprise a communication device connectable to one of the other devices/network via a wired connection.

The first and second operator 102 and 104 uses the communication networks 110 and 120 for communication through an antenna 130 via wireless links 105 and 115. For example, the first and second network may be or may include, for example, a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), One way and/or two-way radio communication systems, cellular radiotelephone communication systems, or the like Types of WLAN and/or WMAN communication systems intended to be within the scope of the present invention.

In some demonstrative embodiments, the first and second operator may include a controller, a receiver, and/or a transmitter (Not shown in figure). For example, transmitter may transmit via antenna wireless RF signals, blocks, frames, transmission streams, packets, messages and/or data, e.g., to second operator via the first and second communication network, and/or receiver may receive via antenna wireless RF signals, blocks, frames, transmission streams, packets, messages and/or data, from the first operator through first and second communication network. Transmitter may include, for example, any suitable RF transmitter, and/or receiver may include any suitable RF receiver. Optionally, transmitter and receiver may be implemented using a transceiver, a transmitter-receiver, or other suitable component. In some embodiments, controller, transmitter and/or receiver may be implemented as part of a Medium Access Control (MAC) layer and/or any other suitable communication layer or configuration.

Referring now to FIGS. 2(*a*), 2(*b*) and 2(*c*), there are illustrated a block diagram of I-BEB (I-Backbone Edge Bridge) 210, B-BEB (B-Backbone Edge Bridge) 220 and IB-BEB 230 according to some demonstrative embodiment of the present invention. FIG. 2(*a*) shows I-BEB 210 includes a CNP port (Customer Network Port), a MAC relay (Media Access Control) unit and a PIP port (Provider Instance Port). The CNP port faces on the customer side in the network and understands the customer frames. The frames could be router frames, host frames or standard based frames as per IEEE standards 802.1Q, 802.1D, 802.1ad, 802.1ah and 802.1Qay. The routed frames from the customers are received by the CNP port and send the same to the MAC relay unit for adding the forward or backward path learning information. The MAC relay unit forwards the received frames/packets based on MAC address learnt from the B-SA (Backbone Source Address) of the incoming frame on that MAC port of the relay. The forwarding can also be provisioned instead of learning. The forwarded frames/packets are received by the PIP port for adding I-tag, Backbone MAC Source Address (B-SA) and Backbone MAC Destination address (B-DA). The PIP can only be connected with other CBP within the network. FIG. 2(*b*) shows B-BEB 220 which includes a CBP port (Customer Backbone Port), a MAC relay (Media Access Control) unit and a PNP port. The CBP port can be only connected with the other PIP in the network. The CBP port receives frames from the PIP port and translates incoming I-tag to an outgoing I-tag. Further it will translate incoming B-DA with the outgoing B-DA. The frames from the CBP are received by the PNP port via MAC relay unit. The MAC relay unit is for adding the forward or backward path learning information. FIG. 2(*c*) shows the combination of I-BEB and B-BEB to form an IB-BEB 230.

Figure 3:
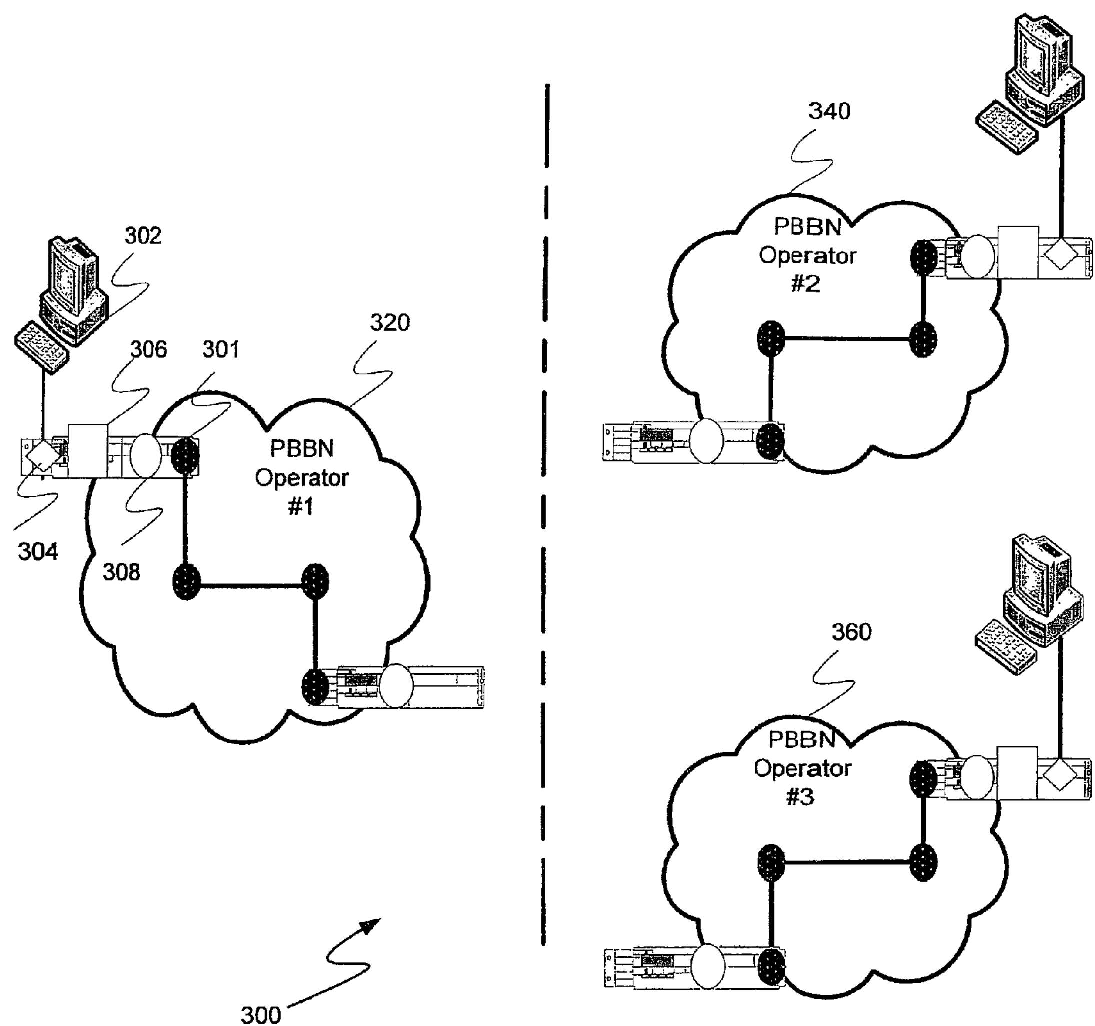
FIG. 3 is a schematic diagram illustrating a communication system in which packet flows from one operator of first PBBN network to the other operator of the second PBBN network according to the present invention.

Referring now to FIG. 3, there is illustrated an example embodiment of a system where a packet flows from one operator of first network to the other operator of the second network according to the present invention. FIG. 3 is an overview diagram of a system and operating environment in conjunction with which embodiments of the invention may be practiced. The description of FIG. 3 is intended to provide a brief, general description of suitable system and environment in conjunction with which the invention may be implemented.

The system 300 includes a first PBBN (Provider Backbone Bridge Networks) operator 320, a second PBBN operator 340 and a third PBBN operator 360. The PBBN operator having plurality of intermediate bridge node (BCB i.e. Backbone Core Bridge and BEB i.e. Backbone Edge Bridge) and each bridge may have plurality of input/output ports. The BEB are placed at the edge of the network for communication with the other PBBN operators, whereas the BCB will lie in the core of the network. The BEB comprises of I-BEB and B-BEB in the PBBN. The I-BEB has two types of ports CNP and PIP, whereas B-BEB has also two types of port as CBP and PNP. Both the backbone bridges can be combined to obtain IB-BEB and BB-BEB. By combining IB-BEB will have CNP, PIP, CBP and PNP. The PIP and CBP are internal ports in IB-BEB and is not visible outside. BB-BEB will have two PNP ports and two internal CBP ports. The two PBBN operators interact each other through their B-BEBs.

In an operation, the first port of the BEB is CNP 304 which receives data frames from the operator of the first PBB network and understands the customer requirement. The frames which were received at the CNP could be router frames, host frames or standard based frames as per IEEE standards 802.1Q, 802.1D, 802.1ad, 802.1ah and 802.1Qay. CNP is operatively linked to a PIP port 306 in the BEB. PIP will receive the data frames from the CNP and adds forward path learning information. The path learning information includes I-tag (Identifier), Backbone MAC Source Address (B-SA) and Backbone MAC Destination Address (B-DA). The I-tag includes customer frame information, kind of service information, job priority information etc. The path learned frame is received by CBP port 308. The CBP identify, copy and isolate the Backbone Source MAC address from the header of the received Ethernet frame and send the Backbone Source MAC address to network processor (not shown in figures) for translation. The network processor processes the received frame by instantiating a table exclusively for translating one-to-one to the own CBP MAC address. Further, the network processor sends the new I-tag, Backbone Destination Address and Backbone Source Address to CBP. Also, the network processor sends a B-tag to CBP for further processing. The CBP receives the frame which has all the path learning information including adds extra tag as B-tag to the received frame. The B-tag includes Backbone VLAN Identifier which comprise of path information. The processed frame so created will have the Backbone Source Address as the CBP MAC address and sent to PNP port 310. By doing this translation, the Backbone Source Address of one PBBN operator will not be learnt in BCB bridges of another PBBN operator. The learning of Backbone Source Address of one PBBN operator is only restricted at the B-BEB of another operator where the translation actually takes place. Consequently, MAC address table will not overflow or MAC address table size will be smaller. Further, it will enable each operator to provision tunnels in his network based on I-tag, B-tag, Backbone Source Address and Backbone Destination Address independent of the Backbone Source Address of the other peering operator.

The system enables operators to provision tunnels that will span one or many bridges or links. This will also mean that not all bridges will have to do tunnel processing. The new B-BEBs will start and terminate a tunnel. If this new B-BEB function is available on all the bridges in PBBN, then it will behave as per-hop tunnel processing i.e. the tunnel identifiers will be swapped or translated every hop. If tunnel identifiers are translated at every hop then it would mean that this network does not have BCB functions.

Figure 4:
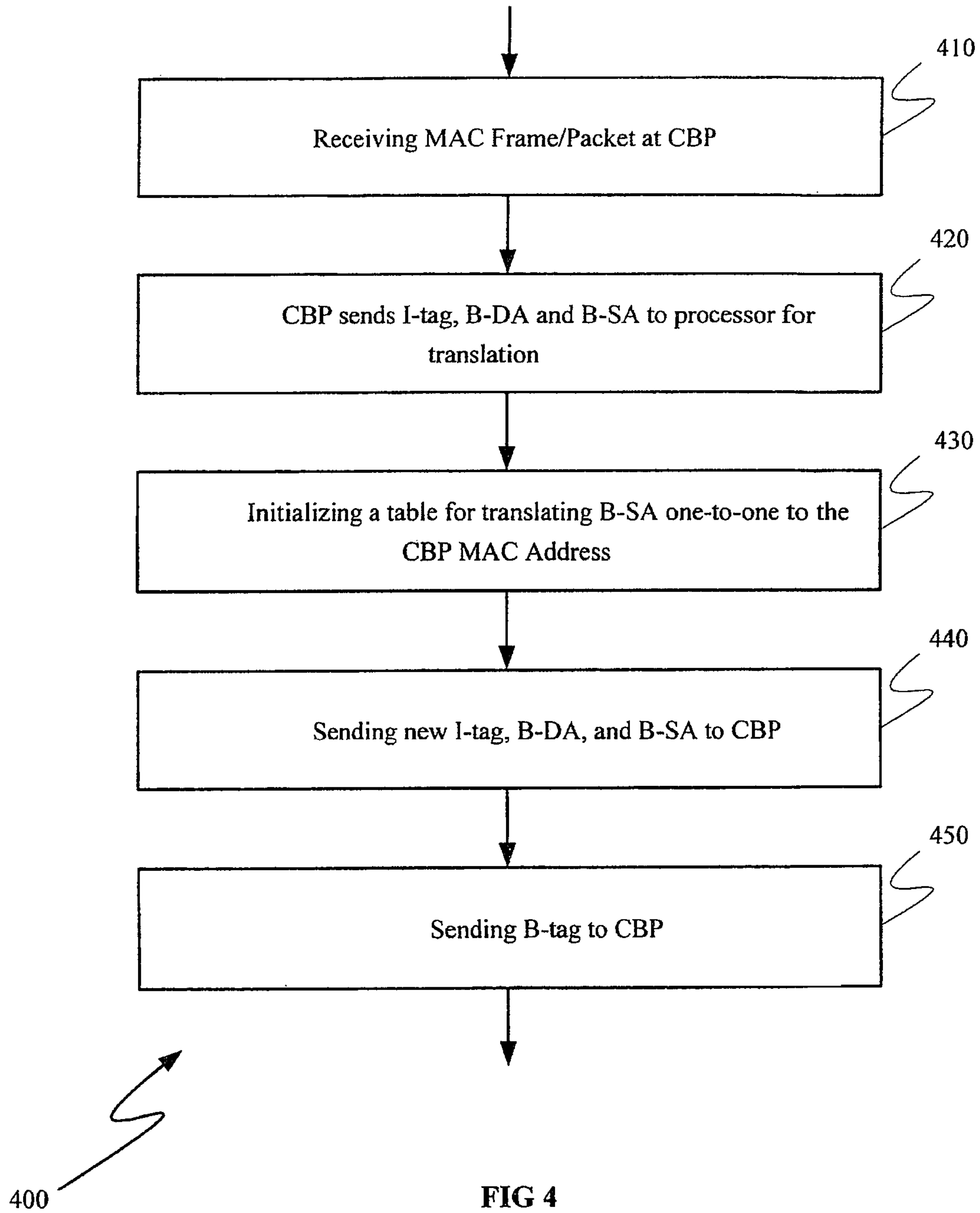
FIG. 4 a flowchart illustrating an example method of translating Backbone Source Address at CBP according to an embodiment of the present invention.

FIG. 4 shows a method according to an embodiment of the invention. At least some part of the method may be implemented as a computer program stored on a computer-readable medium, such as firmware, for execution by a processor. The method may be performed by the system of FIG. 1 or the system of FIG. 3 that have been described, although the invention is not so limited. Referring now to FIG. 4, there is illustrated a method 400 of translating Backbone Source Address at CBP. At step 410, the method 400 receives a MAC frame/packet at the CBP port from PIP port of a BEB. The frames/packets received at the CBP are router frames, host frames or standard based frames as per IEEE 802.1Q, 802.1D, 802.1ad, 802.1 ah and 802.1Qay. The received frames/packet has the I-tag, Backbone MAC Source Address (B-SA) and Backbone MAC Destination Address (B-DA). At step 420, the CBP sends I-tag, B-DA and B-SA to a network processor for translation. At step 430, the network processor instantiating a table for translating one-to-one to the CBP MAC Address. The network processor translate incoming I-tag, incoming B-DA and incoming B-SA to the outgoing I-tag, outgoing B-DA and outgoing B-SA. At step 440, the network processor after translating the old I-tag, B-DA and B-SA sends a new I-tag, new B-DA, and new B-SA to CBP port. The table 1 shown below is the translation of incoming and outgoing frame in the network processor as an example.

TABLE 1 shows the translation of Backbone MAC Address in the Network Processor

| Incoming I-Tag | Outgoing I-Tag |
|---|---|
| I-Tag 1 (e.g. I-SID = 0x00-00-01) | I-Tag 2 (e.g. I-SID = 0x00-00-02) |
| Incoming B-DA | Outgoing B-DA |
| B-DA1 (e.g. 0x00-1B-77-8F-D5-0E) | B-DA2 (e.g. 0x00-1B-77-8F-D5-0D) |
| Incoming B-SA | Outgoing B-SA |
| B-SA1 (e.g. 0x00-1B-77-77-77-10) | B-SA2 (e.g. 0x00-1B-77-80-00-11) |

At step 450, the network processor sends a B-tag to CBP. The B-tag which includes Backbone VLAN Identifier which comprise of path information for guiding the frame to which path it has to take. The frame which has new I-tag, new B-DA, new B-SA and B-tag is received by the PNP. The PNP port will have B-SA as the CBP MAC address.

Although the flowchart 400 includes steps 410-450 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 5:
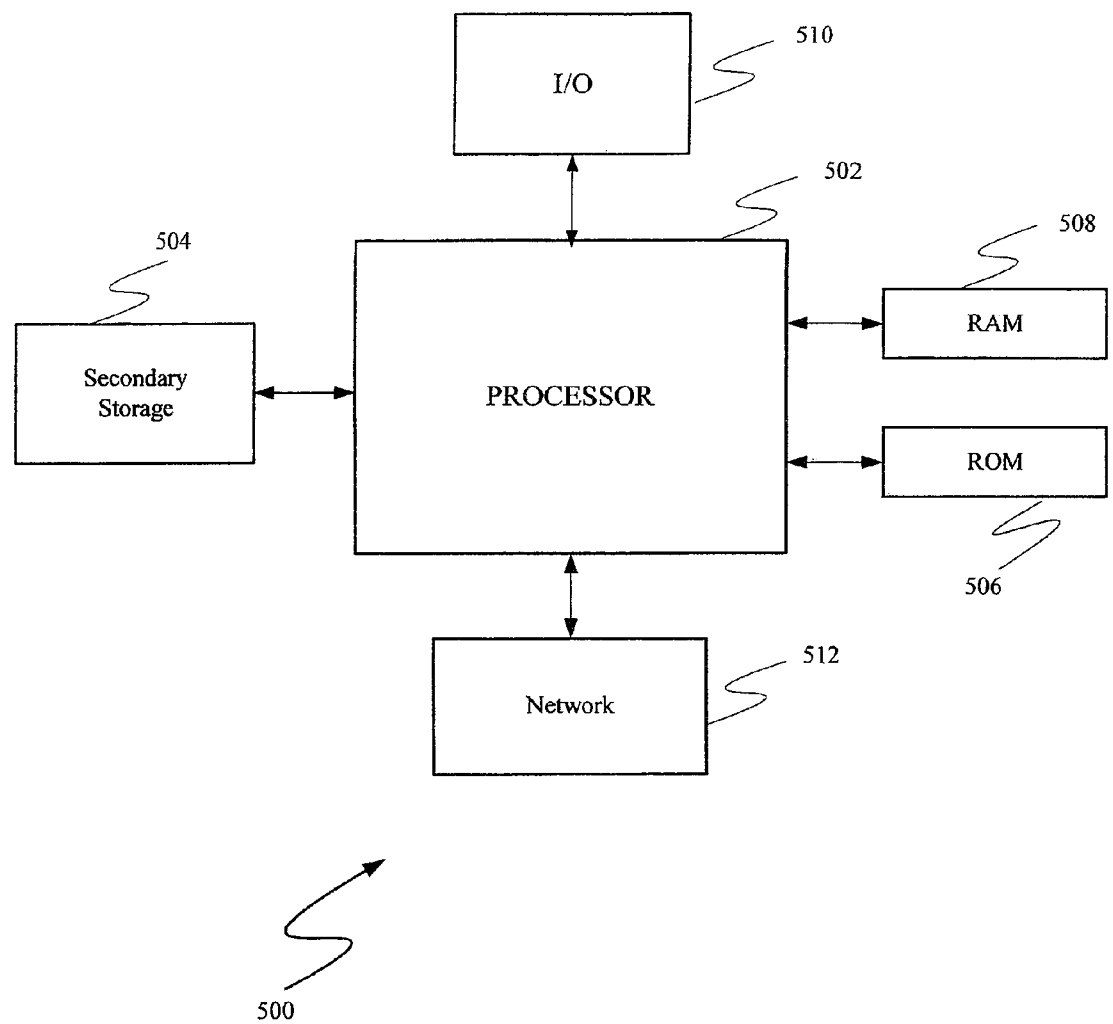
FIG. 5 illustrates a typical, general-purpose network component suitable for implementing one or more embodiments.

The network described above may be implemented on any general-purpose network component, such as a computer, router, switch, or bridge, with sufficient processing power, memory resources, and network throughput capability to handle the necessary workload placed upon it. FIG. 5 illustrates a typical, general-purpose network component suitable for implementing one or more embodiments of a node disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) 510 devices, and network connectivity devices 512. The processor may be implemented as one or more CPU chips, or as one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage. The RAM 508 is used to store volatile data and perhaps to store instructions. Access to both ROM 506 and RAM 508 is typically faster than to secondary storage 504.

FIGS. 1-5 are merely representational and are not drawn to scale. Certain portions thereof may be exaggerated, while others may be minimized. FIGS. 1-5 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein,” respectively.

We claim:

1. A method of preventing Media Access Control (MAC) address learning in a data path from a first Provider Backbone Bridge (PBB) network to a second PBB network, said path passing through a plurality of intermediate bridge nodes in the PBB network having a plurality of input/output ports for data communication, the method comprising:

receiving, at Customer Backbone Port (CBP) of a Backbone Edge Bridge (BEB), data frames from at least one operator/client of the first PBB network which has to be communicated to at least one operator/client of the second PBB network;

adding forward path information to the received data frames in the first PBB network, wherein the forward path information comprises I-Tag, B-Tag, Backbone MAC Source Address (B-SA) and Backbone MAC Destination Address (B-DA); and translating a backbone MAC source address of the received data frame at the first PBB network by replacing the backbone MAC source address with the BEB backbone MAC address, wherein translating comprises instantiating a table for translating one-to-one of the Backbone Source Address to its own CBP MAC Address, and wherein the table comprises a mapping between I-Tag, B-SA, and B-DA of the received data frame and corresponding translated I-Tag, B-SA, and B-DA, and wherein the translated I-Tag, B-SA, and B-DA, and B-Tag are sent to the CBP, thereby preventing of backbone MAC address learning of the first PBB network in the second PBB network, at the CBP of the BEB of the first PBB network.

2. The method of claim 1, wherein the path passing through the plurality of intermediate bridge nodes in the PBB network includes I-Backbone Edge Bridge (I-BEB) and B-Backbone Edge Bridge (B-BEB), wherein the path passing through the plurality of input/output ports are Customer Network port (CNP), Provider Instance Port (PIP), Customer Backbone Port (CBP), and Provider Network Port (PNP) of the I-BEB and B-BEB.

3. The method of claim 1, further comprising storing the received data frames from at least one operator/client of the first PBB network in at least one memory.

4. The method of claim 1, wherein the received data frames includes router frames, host frames or standard based frames as per Institute of Electrical and Electronic Engineers (IEEE) 802.1Q, 802.1D, 802.1ad, 802.1ah and 802.1Qay.

5. The method of claim 1, wherein the step of receiving data frames from at least one operator/client of the first PBB network are at the CNP port of the BEB.

6. The method of claim 1, wherein the step of adding forward path information is at PIP port of the BEB of the first PBB network, wherein the step of adding forward path information includes I-tag, B-tag, backbone MAC source address and backbone MAC destination address.

7. The method of claim 1, further comprising translating incoming I-tag and backbone destination address to outgoing I-tag and backbone destination address.

8. The method of claim 1, wherein the received data frames includes router frames, host frames or standard based frames as per IEEE 802.1Q, 802.1D, and 802.1Qay.

9. A system of preventing Media Access Control (MAC) address learning in a data path from a first Provider Backbone Bridge (PBB) network to a second PBB network, said path passing through a plurality of intermediate bridge nodes in the PBB network having a plurality of input/output ports for data communication, the system comprising:

means for receiving, at Customer Backbone Port (CBP) of a Backbone Edge Bridge (BEB), data frames from at least one operator/client of the first PBB network which has to be communicated to at least one operator/client of the second PBB network;

means for adding forward path information to the received data frames in the first PBB network, wherein the forward path information comprises I-Tag, B-Tag, Backbone MAC Source Address (B-SA), and Backbone MAC Destination Address (B-DA); and means for translating a backbone MAC source address of the received data frame at the first PBB network by replacing the backbone MAC source address with the BEB backbone MAC address, wherein translating comprises instantiating a table for translating one-to-one of the Backbone Source Address to its own CBP MAC Address, and wherein the table comprises a mapping between I-Tag, B-SA, and B-DA of the received data frame and corresponding translated I-Tag, B-SA, and B-DA, and wherein the translated I-Tag, B-SA, and B-DA, and B-Tag are sent to the CBP, thereby preventing of backbone MAC address learning of the first PBB network in the second PBB network, at the CBP of the BEB of the first PBB network.

10. The system of claim 9, further comprising means for storing the received data frames from at least one operator/client of the first PBB network in at least one memory.

11. The system of claim 9, wherein the means for receiving receives data frames from at least one operator/client of the first PBB network is a Customer Network Port (CNP) of the BEB.

12. The system of claim 9, wherein the means for adding forward path information adds tags at a Provider Instance Port (PIP) port of the BEB of the first PBB network.

13. The system of claim 9 further comprising means for translating incoming I-tag and backbone destination address to Outgoing I-tag and backbone destination address.

* * * * *